United States Patent [19]
Trobaugh et al.

[11] 4,188,968
[45] Feb. 19, 1980

[54] FLOW SYSTEM WITH PRESSURE LEVEL RESPONSIVE AIR ADMISSION CONTROL

[75] Inventors: Arnold G. Trobaugh, Milwaukee; George J. Janu, Brookfield, both of Wis.

[73] Assignee: Johnson Controls, Inc., Milwaukee, Wis.

[21] Appl. No.: 846,405

[22] Filed: Oct. 28, 1977

[51] Int. Cl.² ............................................. F16K 31/126
[52] U.S. Cl. ................................ 137/236 R; 137/488; 137/403
[58] Field of Search ................ 137/486, 488, 205, 403, 137/236; 4/10

[56] References Cited
U.S. PATENT DOCUMENTS 3,776,249  12/1973  Wailes ..................................... 137/486
3,777,778  12/1973  Jana ........................................ 137/487.5

Primary Examiner—Alan Cohan
Attorney, Agent, or Firm—Andrus, Sceales, Starke & Sawall

[57] ABSTRACT

A vacuum operated sewerage system includes a static pressure sensor establishing a trigger signal at selected first level in a standpipe. The sensor is connected upstream of a discharge control valve and actuates a timer at the selected sensed pressure. The timer is connected to actuate the discharge control valve after a suitable time delay to prevent transient signal actuation, and establish flow for a predetermined period. An air admission valve is connected in series with the sensor to the timer to actuate the timer if the system vacuum drops below a selected level in the same manner as an increased hydrostatic pressure. The sensor can be eliminated for separate air admission control directly in response to the vacuum condition of the line.

15 Claims, 1 Drawing Figure

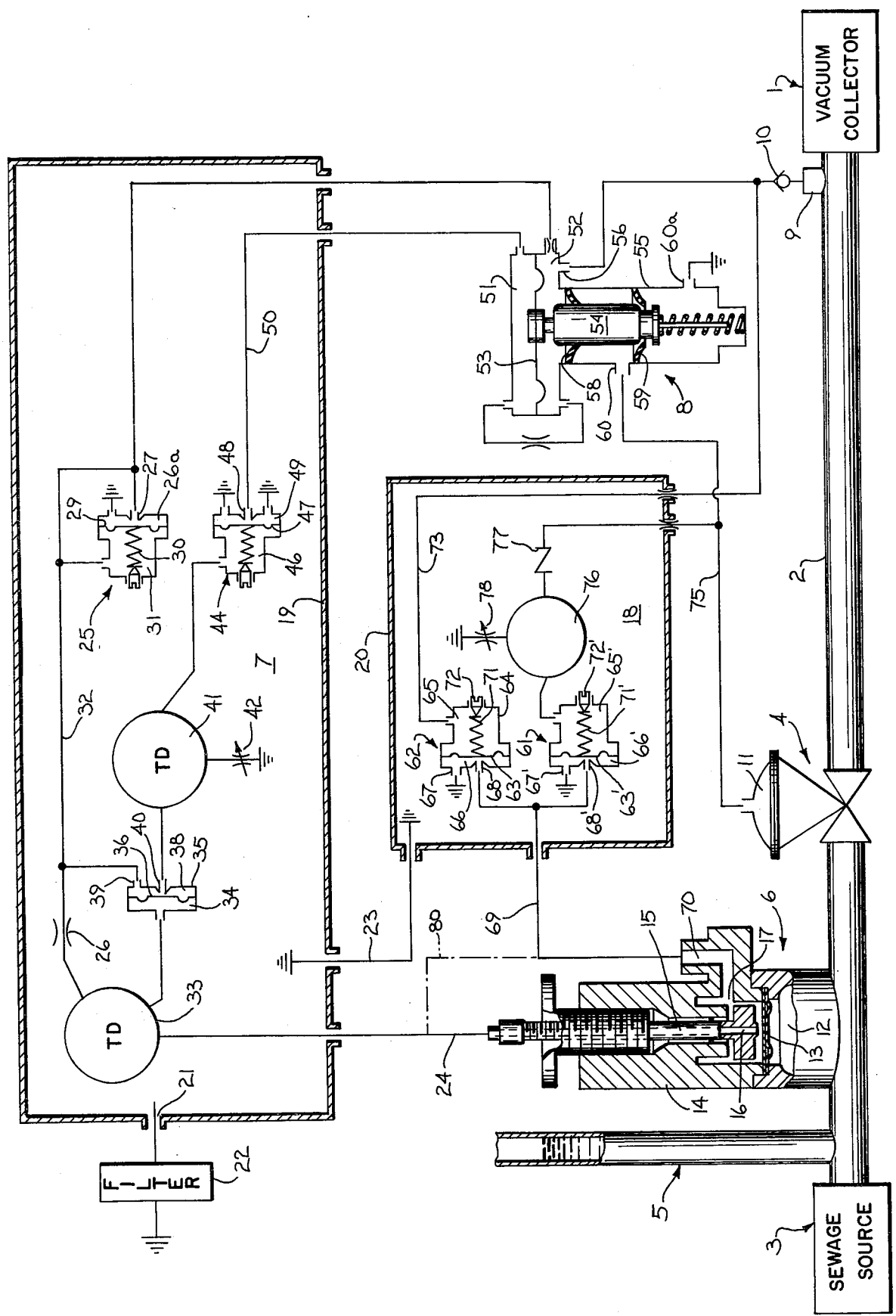

FLOW SYSTEM WITH PRESSURE LEVEL RESPONSIVE AIR ADMISSION CONTROL

BACKGROUND OF THE INVENTION

This invention relates to a pressure lock controller and particularly to such a controller for a vacuum operated flow system.

In various flow systems, the pressure differential for establishing flow may include a downstream vacuum source. A temporary storage means such as a storage tank, a standpipe or the like within which liquid is stored until it reaches a selected level may be incorporated into the system. When such a selected level is reached, a discharge apparatus is actuated to remove liquid generally until a lower limit is established.

In vacuum operated sewage collection systems, for example, a standpipe is provided upstream of a main discharge valve. A vacuum collector is connected to and establishes a vacuum in the flow line for the transportation of the sewage. A particularly satisfactory two-position liquid level controller is disclosed in U.S. Pat. No. 3,777,778. The fluid sensor is mounted upstream of the discharge control valve and is connected to actuate a triggered controller having a fluid relay connected to charge a fluid timing capacitor which, in turn, actuates a fluid switch. The timing capacitor is preferably a storage device connected to atmospheric pressure through an adjustable resistor. When the output signal from the sensor if received, the vacuum connection to the capacitor is momentarily made and the vacuum established as a reference. The storage device signals the fluid switch which actuates a pilot valve to open the main valve. The sewerage flow continues until such time as the main capacitor has totally discharged, at which time the switch converts to an "off" condition, resetting the pilot valve and moving the main valve to a closed condition. The timing provides a constant volume of the liquid discharged per cycle independent of the input flow into the system. This is particularly significant in flow systems which rely on a slug or incremental liquid transfer in response to a given condition; such as a vacuum powered sewage transport system and the like.

The timer is a pressure triggered timer and is connected to the flow system as a pressure source. The timer is operable in response to an initial trigger or pulse signal from the sensor and accurately maintains a timing period over a considerable change in the supply or input pressure.

In operation of such vacuum operated systems, a low vacuum condition may be created in the sewer line between the main control valve and the vacuum source by low points in the flow line being filled by sewage and/or by a partial system bogdown or water logging. The sewage or water laying in the low points thus prevents creation of system vacuum and interferes with proper system operation. The system vacuum can be restored by admitting air into the system to force the sewage in such low points forward toward the collection station and clearing of such low points.

SUMMARY OF THE PRESENT INVENTION

The present invention is particularly directed to an automatic admission control means for sensing a low system pressure condition and signalling a controller for supplying pressure to the line and thereby positively clearing of the system line and re-establishing proper system pressure. Generally, in accordance with this invention, the admission control means includes a triggered means connected to the system and responsive to low system pressure to produce a trigger pressure signal at a controller input. A reset means is connected to the controller input to by-pass and thus reset the output of the control means and, thereby, the trigger signal input to the controller means in response to opening of the main valve means. The admission control means may be connected directly to the trigger input of the controller or in series with a normal system operating sensor.

In a particular embodiment of the invention, an air admission valve means includes a bleed-type trigger valve means such as a diaphragm bleed valve connecting the controller trigger input to a signal pressure. The valve means includes a pressure input connected to the vacuum side of the line to establish the trigger signal when the vacuum falls below a selected level. A parallel bleed-type valve means is connected in parallel with the trigger valve means connecting the controller trigger input to the signal pressure and includes a pressure input connected to a pilot valve means for actuating the main valve. The reset valve means is actuated by application of valve opening pressure to the main valve to reset the input to the controller. The reset valve preferably includes a timing means to hold the reset valve means actuated for a predetermined period following closing of the pilot valve means and, therefore, the main valve means and allow resetting of the trigger valve means upon closing of the main valve means.

In a practical embodiment of the invention, the trigger valve means and the reset valve means are adjustable spring-loaded pressure responsive diaphragm valves. The trigger valve means is normally open and the reset valve is normally closed. The input pressure chamber of the trigger valve is connected to the line. The input pressure chamber of the reset valve is connected to a timing chamber which is connected to the pilot valve in series with a fluid diode and also to reference pressure via a discharge restriction. The trigger valve closes at the selected vacuum level to open the main valve. The timing chamber is charged by the opening of the main valve to open the reset valve and is held open by the discharging timing chamber for a selected period after the main valve closes. This allows the trigger valve to reset and place the system in standby after clearing of the line of the blockage.

The present invention provides a reliable means which may employ readily available components for automatically cycling a controller to introduce air into a vacuum operated system permitting normal system operation.

BRIEF DESCRIPTION OF THE DRAWING

The drawing furnished herewith illustrates a preferred construction of the present invention in which the above advantages and features are clearly disclosed as well as others which will be readily understood from the description of such illustrated embodiment.

The drawing is a schematic circuit illustrating a vacuum operated sewage flow system incorporating a pressure sensor and controller apparatus constructed in accordance with the present invention.

DESCRIPTION OF ILLUSTRATED EMBODIMENT

Referring to the drawing, a sewage flow system, similar to that disclosed in U.S. Pat. No. 3,777,778, includes a vacuum collector 1 at a collection end of a flow line 2 coupled to a sewage source 3. A main discharge valve 4 is provided in the flow line 2 and is periodically actuated to provide for transfer of a predetermined amount of sewage to the collector. A standpipe 5 is connected to the upstream end of the flow line 2 and within which the sewage will accumulate. As the sewage accumulates, the hydrostatic pressure in the flow line 2 increases accordingly. A hydrostatic pressure sensor 6 connected to the flow line 2 responds to the hydrostatic pressure and at a selected pressure level actuates a pneumatic triggered timing controller 7 which, in turn, is connected to actuate a pilot valve 8. The main valve 4 is selectively opened and closed by the operation of pilot valve 8 connecting pressure to an operating valve chamber 11. The valves 4 and 8, sensor 6 and timer 7 are all pneumatic pressure responsive devices which are connected directly into the vacuum system via a connection tap 9 and a check valve 10 such that the controller system is driven from the main pressure means as a common power source.

Generally, the sensor includes an inlet chamber 12 coupled to the line 2 to impress flow line pressure upon a diaphragm unit 13 which is clamped against an upper housing 14. A screw nozzle 15 extends through the housing 14 and terminates in an adjustable orifice 16 in alignment with the central portion of the diaphragm 13 within an exhaust chamber 17 which is coupled to atmosphere. The connection to atmosphere or reference pressure is shown including a special air control valve means 18 particularly forming an embodiment of this invention, as more fully described hereinafter.

The controller 7 and the air control valve means 18 are diagrammatically shown having suitable airtight enclosures 19 and 20. The controller 7 includes an atmosphere input 21 having a filter 22 to supply filtered air within the enclosure 19 which provides a source of air suitable for use in the control. The enclosures 19 and 20 are connected as shown at 23 for supplying filtered air to the operating components of the control valve means 18.

If either the sensor 6 or valve means 18 is actuated, the atmospheric pressure to controller 7 is cut-off and controller 7 is triggered to initiate a timing cycle which is completed even though the triggering source, sensor 6 or valve means 18, is reset. Sensor 6 functions, as disclosed in the above patent, to open the main valve 4 when sewage has accumulated to a level for developing a slug of sewage for movement through the line 2. The valve means 18 responds to drop in the vacuum pressure level upstream of valve 4, and particularly at connection 10 in the illustrated embodiment. Thus, the falling vacuum pressure is generally associated with clogged low point in the flow line 2, particularly such as is often encountered in highly rocky environments. The actuation of valve means 18 also triggers controller 7 to establish a timed opening of the valve 4. The additional supply of air into the line without a new sewage slug forces the blockage from the low point and reestablishes system pressure upon closure of valve 4.

The adjustable orifice 16 of sensor 6 is connected to the exhaust via the air admission control 18 in accordance with the spacing of the diaphragm 13 to provide a leakport type operation. The output of the sensor 6 is connected to a back pressure signal line 24 which is connected to the flow line connection 9 via a vacuum regulator 25 and a restrictor 26 to develop a pressure signal to controller 7.

The vacuum regulator 25 is preferably constructed in accordance with the teaching of U.S. Pat. No. 3,662,779 and includes a control chamber 26a having a nozzle 27 connected to the restrictor 26 and supplied with pressure from tap 9. A diaphragm 29 is biased toward the nozzle by means of an adjustable compression spring 30. A control chamber 31 is connected via a common line 32 to nozzle 27. A closely regulated pressure is formed at line 32.

The timing network or controller 7 includes an input time delay capacitor or chamber 33 connected between the line 24 and an input chamber 34 of a comparator or relay 35. The relay 35 is a diaphragm unit including a convoluted diaphragm unit 36 defining the signal chamber 34 connected to time delay chamber or capacitor 33 and an output chamber 38 which is connected via tap 39 to the regulated pressure supply line from regulator 25. A control nozzle 40 terminating within the chamber 38 is selectively closed and opened by diaphragm 36. The output signal from sensor 6, which is either atmosphere or regulated vacuum is transmitted via the time delay chamber 33 to position the diaphragm 36. With sensor 6 fully open, atmospheric pressure is impressed on diaphragm 36 to close nozzle 40. The nozzle 40 is opened at a selected hydrostatic pressure level in pipe 5 as a result of cutoff of the sensor orifice 16, and, as more fully described in U.S. Pat. No. 3,777,778, thereby establishing a full and free connection of the vacuum source to the nozzle 40.

The nozzle 40 is connected to a timing capacitor 41 having a second input including time adjust restrictor 42 which connects the capacitor to atmosphere. The capacitor 41 is thus connected to vacuum via nozzle 40 or atmosphere via restrictor 42, and has an output connected to actuate a diaphragm switch 44.

Switch 44 is an adjustable spring loaded diaphragm unit similar to the regulator having an input chamber 46 connected to capacitor 41. A nozzle 48 connects output chamber 49 via a coupling line 50 to the pilot valve 8. Chamber 49 is connected to atmosphere. The spring loaded diaphragm 47 normally closes nozzle 48. When the vacuum is transmitted to the input chamber 46 of the switch, the vacuum overcomes the force of the spring 45, causes the diaphragm 47 to open the nozzle 48 and the line 50 assumes the atmospheric pressure level.

Pilot valve 8 is a diaphragm operated spool unit having the reference chamber 51 an a control chamber 52 defined by a common diaphragm 53. The spring-loaded spool 54 is affixed to the diaphragm 53 and positioned thereby within a valve housing 55. Chamber 52 is connected via a rap 56 to the flow line vacuum. An output tap 60 is provided intermediate the valve openings 58 and 59 and is connected to the control chamber 11 of the main valve 4 and to the air admission control valve 18, which particularly forms an embodiment of the present invention. The valve opening 58 provides connection to the chamber 52 which the valve opening 59 provides a communication to a reference pressure connection 60a. With a full flow line vacuum in both chambers 52 and 51, the spool 54 moves to its uppermost position, closing the valve opening 58 and opening the valve opening 59, thereby connecting the atmospheric pressure to the main valve 4, which stays in closed position. When atmospheric pressure is established in the chamber 51 by switch 44, spool 54 moves downwardly to close the valve opening 59 and open valve opening 58, thereby transferring vacuum pressure to chamber 11 of the main discharge valve which opens. Thus, the output of the switch 44 of the timer 7 controls the pilot valve 8 which, in turn, controls the opening and closing of the main control valve 7, as more fully discussed in U.S. Pat. No. 3,777,778.

The air admission control unit 18 includes a high level sensor valve 61 and a low level sensor valve 62. The valves 61 and 62 are connected in parallel between the sensor 6 and the atmosphere within housing 18. Under normal operation, one of the valves 61 or 62 is open to supply atmospheric pressure to the sensor 6 and provide for the normal controller operation, as just described. The valves 61 and 62 are pressure responsive and are coupled to the pilot valve 8 for controlling the valves and during normal vacuum pressure conditions to permit the above functioning. The valves 61 and 62 also automatically trigger the controller 7 to open the main valve 4, and, thereby, introduce air into the system, if the vacuum falls to a selected level, as follows.

The illustrated valve 62 is an adjustable valve similar to the pressure regulator valve 25 and the switching valve 44. The valve 62 thus includes a diaphragm 63 in a valve body 64 and defining a pressure input chamber 65 and an output or control chamber 66. The control chamber 66 is connected to atmosphere at 67 and includes a nozzle or orifice 68 connected by line 69 to the sensor reference port 70. The orifice 68 is opened and closed by the diaphragm 63 which is biased to a closed orifice position by a preload coil spring 71 coaxially located within the chamber. An adjustment screw 72 is threaded into the body for controlling the compression of the coil spring 71 and thereby the closing force applied to the diaphragm 63. The pressure input chamber 65 is also connected via a line 73 directly to the vacuum signal line connection or tap to the downstream such that the vacuum side of check valve 10 pressure of line 2 is also applied to the diaphragm 63. The diaphragm 63 is, therefore, positioned by the differential fluid pressure in the chambers 65 and 66 and the force of spring 71. Under a normal operating vacuum level, the pressure differential is such that the spring force is overcome, the valve 62 opens and connects the sensor reference port or orifice 68 to atmospheric pressure. However, as the line vacuum pressure falls, the pressure differential decreases and at a selected pressure level the spring force predominates and the valve 62 closes. This cuts off the reference pressure connection, assuming the parallel valve 61 is also closed, as hereinafter described, and the controller 7 is triggered and functions in the same manner as previously described to open the main valve, thereby introducing air into the system upstream of the sewage and forcing the sewage from the low point. The cycle is completed by the closing of the vacuum switch.

After initiation and during the forced controller cycle, the air admission controller 18 is reset by opening of the reset valve unit 61. The latter is similar to the trigger valve unit 62 and corresponding components are identified by corresponding primed numbers for simplicity of explanation.

The reset valve 61 has its orifice 68' connected to the pressure line 69 to the reference port 70 of the sensor 6 for providing an alternate, paralleled connection to the atmosphere at port 67'. The input reference pressure chamber 65' is connected to the common connection or line 75 from the output of the pilot valve 8 and the input chamber 11 of the main valve 4 in series with timing capacitor 76 and a fluid diode 77. The timing capacitor 76 is also connected to atmosphere by an adjustable bleed or discharge orifice 78. Chamber 65' of valve 61 is subjected atmospheric pressure which appears in line 75 with the pilot valve 8 in the position shown which corresponds to the main valve closed condition. The atmospheric pressure holds diaphragm 63 in abutting and closing engagement with the nozzle 68' of reset valve 51. In this state, the valve 62 is the only connection of atmospheric pressure to the connection 70 of sensor 6 and the system operates as previously described.

If the vacuum in line 9 drops below the set point of valve 62, the valve 62 closes and triggers the controller 7 as described above. The pilot valve 8 indexes to supply vacuum to the main valve 4 for opening thereof via line 75. This applies vacuum pressure to the timing capacitor 76 which is rapidly charged to the line vacuum level. This vacuum pressure is, of course, also impressed on the chamber 63' of reset valve 61, which now opens as a result of atmospheric pressure at tap 67' and chamber 66'. The opening of reset valve 61 again connects the reference port 70 of the sensor 6 to atmosphere via line 69, orifice 68', chamber 66' and port 67' and thus resets the input to the controller 7, similar to the reset provided by the operation of the sensor in opening its orifice 16 when it triggers controller 7 and valve 11 opens to reduce the static pressure on sensor 6 under normal operation.

Upon completion of the controller cycles as a result of the closing of valve 62, the pilot valve 8 resets and main valve 4 closes. The valve 62 has of course been held closed by the opening of main valve 4 and thus would tend to trigger a new cycle. However, the reset valve 61 opened with the vacuum pressure applied via capacitor 76. Further, during a short period after the pilot valve 8 resets to apply atmospheric pressure to line 75, the capacitor 76 is at a vacuum pressure level. Thus diode 77 prevents discharge through the line 75 and valve 8; and capacitor 76 slowly discharges through restrictor 78. Valve 61 is thus held open for the discharge time of capacitor 76. This time period is selected sufficiently long for the vacuum level in line 2 to drop to the normal vacuum and allow valve 62 to reset and open nozzle 68 before valve 61 resets and closes nozzle 68'.

The system thus resets to the normal standby position in which the system is responsive to the operation of sensor 6.

The air admission control means thus provides a simple line actuated means for preventing system bogdown or lockup as a result of the flow line arrangement or the like. Further, the system is conveniently and readily applied to present commercial installations without the necessity of complex and expensive adapting means.

Although shown employed as an addition to a hydrostatic sensor controlled system, the control means may of course be directly applied to actuate the illustrated triggered controller or any other similar controller. For example, if the connecting line 69 is connected directly to line 24 as shown in phantom at 80, and the sensor 6 removed, the system will open valve 4 whenever operating line vacuum is lost.

The present invention thus provides a simple, reliable air admission control means which may be conveniently and directly applied in accordance with system requirements.

Various modes of carrying out the invention are contemplated as being within the scope of the following claims, particularly pointing out and distinctly claiming the subject matter which is regarded as the invention.

I claim:

1. In a sewage flow system employing a vacuum source means connected to the downstream end of a sewer line buried in the ground for conducting sewage through the line as a result of pressure and which line may include low accumulating portions, a fluid activated sewer line valve means having an operator means for opening and closing said sewer line, a fluid controller means having a triggered input means for actuating said operator means of said valve means, fluid supply means for supplying fluid to said controller and said operator means, a fluid admission control means connecting said fluid supply means to said controller and including set means coupled to said sewer line downstream of said valve means and responsive to a selected line pressure to actuate the control means and including reset means for resetting the admission control means in response to the opening of the line valve means.

2. The flow system of claim 1 wherein said admission control means includes a vacuum level sensor connected to said sewer line and a pressure actuated valve means connected to said sensor for actuating the controller means.

3. In the sewage flow system of claim 2 wherein said pressure actuated valve means includes said reset means, said reset means includes a timing means operable to reset the line valve means a preselected time after said selected line pressure conditon is sensed.

4. In the sewage flow system of claim 1 having a source of pressure and wherein said admission control means includes a high pressure level sensing set valve means having an input signal chamber connected to the sewer line and having a valved passageway connected to said fluid supply means and to said controller means to supply a trigger signal pressure to the controller in response to closing of said valved passageway, said reset means includes a low pressure level sensing reset valve means having an input signal chamber selectively connected to said source of pressure in response to opening of the sewer line valve means and having a reset passageway to by-pass the first valved passageway and operative to remove said trigger signal pressure from said controller in response to opening said reset passageway, and a fluid time delay means connected between the input chamber of the reset valve means and the source of pressure.

5. The sewage flow system of claim 4 wherein said set valve means and reset valve means are each a diaphragm valve having an output chamber having a control nozzle connected to the controller.

6. The sewage flow system of claim 5 wherein said set and reset valve means each include adjustable bias means resiliently urging the corresponding diaphragm to engage the set and reset control nozzles.

7. The sewage flow system of claim 4 wherein said time delay means is connected to the reset means to operate the reset means after a selected time delay means, and including a pilot valve having first input means connected to atmospheric pressure and second input means connected to the vacuum side of the line valve means, said pilot valve having an output connected to activate said sewer line valve means and to activate said time delay means.

8. The sewage flow system of claim 6 wherein said source of pressure and said fluid supply means is the atmosphere and an enclosure is provided for said set and reset valve means and includes a filtered air supply to the enclosure for supply air to said valve means.

9. The sewage flow system of claim 4 wherein said controller and said admission control means each include a substantially fluid tight enclosure and having first filtered input means connected to atmospheric pressure, passageway means connecting said enclosures, said set and reset valve means having input means connected to atmospheric pressure within the enclosure for said admission control means.

10. The system of claim 1 including a pressure operated line valve, said fluid supply means includes a regulated pressure supply means connected to said controller, a sensor including a diaphragm amplifier having a sensing chamber connected to said sewer line and having a reference input chamber connected in series with said fluid supply means for establishing an output signal at a selected line pressure level, said fluid admission control means including a first and second control valve means connected in parallel with each other and in series with said pressure supply means and said reference input chamber, said set means including said first valve means being operable to establish a trigger signal to said controller in response to a selected loss of line vacuum pressure, a comparator means including a reference input means connected to said supply means and having a signal input means, a timing means including a pressure time delay means connected to said diaphragm amplifier and said signal input means, a second supply means, and a second pressure time delay means connected to said comparator to rapidly establish a first output state and to said second supply means to establish a second state after said predetermined period and to actuate said line valve for a fixed period, and said second control valve means including a fluid operator connected to said line valve and operable to by-pass the first valve means during the period the line valve is open and for a selected period thereafter.

11. A sewage flow system employing a vacuum source means connected to the downstream end of a sewer line buried in the ground for conducting sewage through the line as a result of pressure and which line may include low accumulating portions, a fluid activated sewer line valve means for opening and closing said sewer line and having a fluid operator, a pilot valve means having a standby position connecting atmospheric pressure to the valve means and an actuated position connecting vacuum pressure to the line valve, a fluid controller means having a triggered input means for actuating said pilot valve means, a pressure sensor connected to said line for sensing accumulation of sewerage, fluid supply means for supplying fluid to said controller and said operator means, an admission control valve means including a high pressure level sensing set valve means having an input signal chamber connected to the sewer line and having valved passageway connected in series with said sensor to said fluid supply means and to said controller means to supply a trigger signal pressure to the controller in response to closing of said valved passageway, said control valve means including a low pressure level sensing reset valve means having an input signal chamber connected to the output of said pilot valve means and having a passageway to by-pass the first valved passageway and operative to remove said trigger signal pressure from said controller, and a fluid time delay means connected between the input chamber of the reset valve means and the pilot valve means.

12. The flow system of claim 11 wherein said time delay means includes a timing chamber connected to said output of the pilot valve means in series with a fluid diode means, a timing control bleed means connected to said chamber for discharging said chamber to atmosphere at a controlled rate to reset the valve means a preselected time after said selected line pressure condition is sensed.

13. The flow system of claim 12 wherein said sensor includes an orifice means and a line pressure diaphragm actuator for opening and closing the orifice means, said set valve and reset valve means are each a diaphragm valve having an output chamber having a control nozzle, said fluid supply means is the atmosphere for atmospheric pressures, means connecting said nozzles to each other and to one side of the orifice means of the sensor, and an atmospheric port in each of said output chambers and connected to said atmospheric pressure.

14. The sewage flow system claim 13 wherein said set and reset valve means each includes a diaphragm overlying the control nozzle and adjustable bias means resiliently urging the corresponding diaphragm to engage the set and reset control nozzles.

15. The sewage flow system of claim 9 wherein said controller and said admission control means includes a substantially fluid tight enclosure and having first filtered input means connected to said atmospheric pressure, passageway means connecting said enclosures, said set and reset valve means having atmospheric ports connected to atmospheric pressure within the enclosure.

* * * * *

UNITED STATES PATENT AND TRADEMARK OFFICE
CERTIFICATE OF CORRECTION

PATENT NO. : 4,188,968

DATED : February 19, 1980

INVENTOR(S) : Arnold G. Trobaugh et al

It is certified that error appears in the above—identified patent and that said Letters Patent is hereby corrected as shown below:

Column 4, line 53, after "51" cancel "an" and substitute therefore -- and --.

Column 4, line 54, after "53." cancel "The" and substitute therefore -- A --.

Column 8, line 7, After "for" cancel "supply" and substitute therefore -- supplying --.

Column 10, line 5, after "system" insert -- of --.

Signed and Sealed this

Sixteenth Day of September 1980

[SEAL]

Attest:

SIDNEY A. DIAMOND

Attesting Officer

Commissioner of Patents and Trademarks